Sept. 15, 1959  J. NAJJAR  2,903,992
DUAL RANGE SPEEDOMETER

Filed Aug. 1, 1956  2 Sheets-Sheet 1

J. NAJJAR
INVENTOR.

BY E. C. McRae
J. C. Faulkner
T. H. Oster

ATTORNEYS

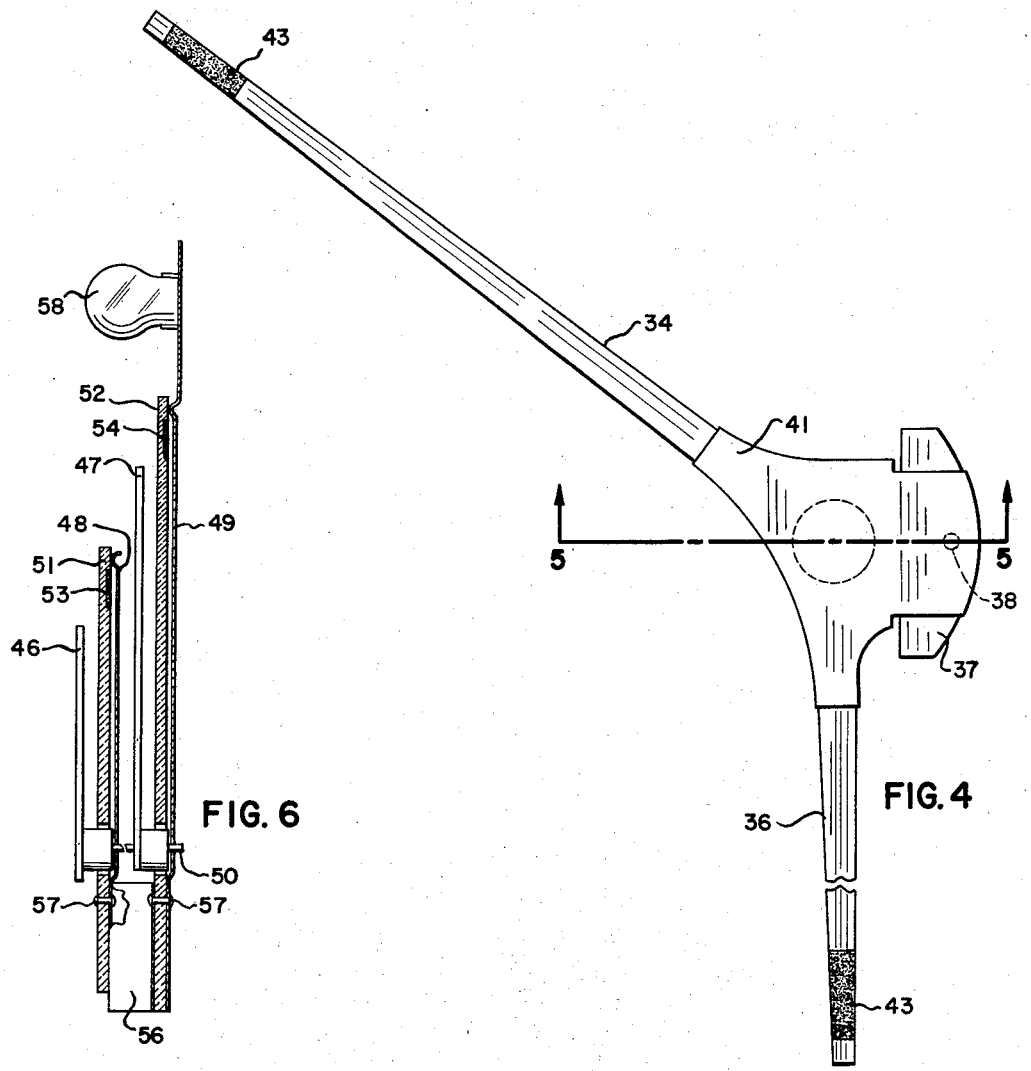

2,903,992
DUAL RANGE SPEEDOMETER

John Najjar, Farmington, Mich., assignor to Ford Motor Company, Dearborn, Mich., a corporation of Delaware Application August 1, 1956, Serial No. 601,515

1 Claim. (Cl. 116—57)

This invention relates to speed indicating means and more particularly to motor vehicle speedometers.

Prior to this invention, there have been numerous methods of indicating the speed of motor vehicles, including the familiar radial dial in which a pointer rotatively passes over a series of radially displaced speed indicating numerals. This type of dial, however, has the disadvantage of requiring a small pointer in a large area. As a result, the operator of a vehicle necessarily must look at a large area before he can readily ascertain his moving speed. Furthermore, his view is frequently obstructed by the steering wheel and horn ring.

In the preferred embodiment of this applicant's device the speed indicating numerals are arranged about the upper periphery of the dial in two evenly spaced rows designating a low and high range respectively. Each row has an indicator pointer mounted about a common axis and in a fixed spaced apart relationship to each other. The last numeral in the low range row is the same as the first numeral in the high range row. Except for one position wherein the low range pointer is on the last numeral and the high range pointer is on the first numeral of the respective rows, only one pointer is visible to the operator of the vehicle. When the low range pointer passes the last numeral of the row, it rotates out of view while the high range pointer is in full view. Consequently, there is at all times an accurate showing of the vehicle's speed.

It is, therefore, an object of this invention to provide a speed indicating construction in which the speed indicating portion is within a relatively confined area.

A further object is to provide a speedometer that incorporates a dual range of speed indicating numerals and a pointer for each of said ranges.

It is another object of this invention to provide a speedometer having a series of ranges and having an indicator pointer for each of the ranges respectively wherein the pointers respectively transverse their respective range and pass out of sight.

Still a further object is to provide an attractive and well balanced speedometer device capable of easy manufacture and relatively low in cost. Other objects and advantages of this invention will be made more apparent as this description proceeds, particularly when considered in connection with the accompanying drawings wherein:

Figure 4 is a front elevational view of a dual range pointer.

Figure 5 is a side elevational view taken on the plane indicated by the line 5—5 of Figure 4.

Figure 6 is a side elevational view partly in section and showing an alternative design having two pointers and dials and with the two pointers shown out of position.

Figure 1:
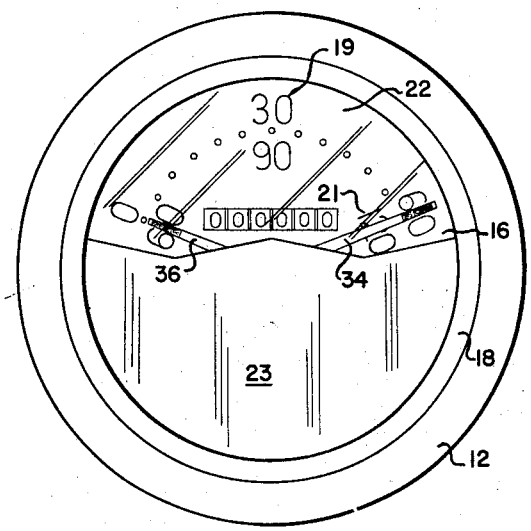
Figure 1 is a front elevational view of a speedometer device embodying a form of the invention and showing the dual pointers at the precise instant where the calibrated speed of the vehicle is the same on both ranges and just prior to the passing of the low range pointers out of view.
Figure 2:
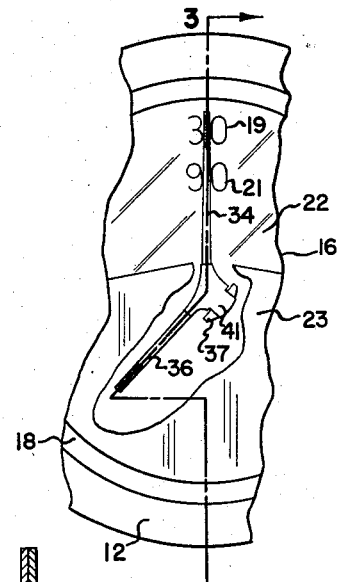
Figure 2 is a fragmentary front elevational view partly in section similar to Figure 1 but showing the dual pointer in a position where the low range pointer is registering on the first range and the high range pointer is hidden from the operator's view.
Figure 3:
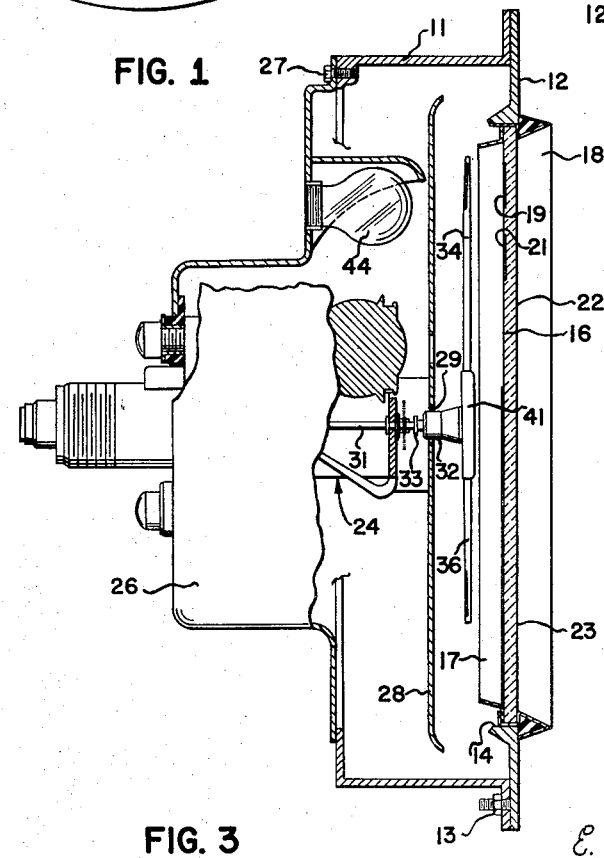
Figure 3 is an enlarged side elevational view, partly broken away and in section, taken on the plane indicated by the line 3—3 of Figure 2.

Referring to the drawings, the speedometer is composed of a housing 11 to which is secured a front cover 12 by an integral bolt and nut means 13 located near the outer periphery of the cover and housing. Front cover 12 has an enlarged opening 14 in which a dial 16 and a truncated cone like member 17 are secured by a conventional bezel 18 to the front cover. The dial 16 is etched or otherwise marked at its upper transparent portion 22 with two rows of speed indicating numerals as shown in Figures 1 and 3 defining a low range 19 and a high range 21. On the other hand, the lower section of the dial 16 which is indicated generally at 23 is opaque, which may be accomplished by painting, masking, or the like.

A conventional speedometer operating mechanism 24 is conventionally secured to rear cover 26 which in turn is secured to the rear of the housing 11 by screws 27. A vertically positioned shield 28 is fixedly secured to the forward end of the speedometer mechanism 24 and is provided with a centrally located aperture 29 which is in axial alignment with the speedometer mechanism shaft 31.

In Figures 4 and 5, the applicant has shown a particular embodiment of a pointer which is manufactured from a transparent plastic material. An axially extending hub 32 is provided with a rearwardly extending sleeve 33 for assembly to the shaft 31. Extending radially outwardly from the forward part of the hub 32 are a pair of angled different length pointers 34 and 36 which correspond to the low and high speed indicating ranges 21 and 22.

It is to be noted that the degrees of angularity between the pointers is dependent upon the width of the ranges except that the pointers must be less than 180° apart. When the pointers 34 and 36 and the ranges 21 and 22 are less than 180° apart, it is then possible to rotate the low range pointer 34 out of view behind the opaque section 23 while the high range pointer is traveling the extent of its range.

The pointer is statically balanced in the usual manner by mounting a metallic counter weight 37 on a pin 38 located in radially extending arm 39. The arm 39 is depressed at the point where the counter weight is installed to permit the counter weight to be mounted to the pin in a nonmovable manner. The pointer is completed by the provision of a metallic cover 41 which covers substantially the outer front hub portion of the pointer and has inturned edges 42 which secures the cover 41 to the pointer. The cover 41 has a twofold purpose in that it prevents the escape of light about the hub area and it further secures the counter weight 37 to the arm 39.

The pointers 34 and 36 are further provided with a roughened area 43 on the back of the pointer which is in alignment with the high and low ranges respectively. Upon the installation of the pointer by means of the sleeve 33 on the shaft 31, as shown in Figure 3, the hub 32 extends slightly inwardly of the centrally located aperture 29 so that the illumination of the pointers is possible by both reflection and refraction of light received from the hooded bulb 44 conventionally secured in the rear cover 26 on the rear of the hub 32.

An alternative pointer and dial arrangement is shown in Figure 6 in which the individual pointers 46 and 47 are manufactured from light materials such as aluminum. The pointers 46 and 47 are angularly displaced from each other about the same common axis and have a common shift connector 50. Rearwardly of each of the pointers 46 and 47 are respective metal masking plates 48 and 49 which bottom against vertically extending transparent plastic dials 51 and 52 having etched or otherwise marked numerals 53 and 54 on the rear of said dials. The dials 51 and 52 and masking plates 48 and 49 are joined together in axially spaced relationship by a spacer bracket 56 and riverts 57. These members are secured at their laterally outer ends in order that the pointer 47 may rotate unrestrictedly. Illumination or edge lighting of the dials 51 and 52 may be obtained through a conventional bulb 58 conventionally secured in the masking plate 49.

It is obvious that more than two rows of speed indicating ranges may be used as well as a like number of pointers integrally connected on a common hub such as is shown in Figure 4 or individually connected as shown in Figure 6. It is also possible to illuminate the pointers or the dial in many ways without departing from the scope of the applicant's invention. Furthermore, it is possible to use dials of edge lighted plastic, reflected light aluminum and/or the like.

The applicant's invention may be housed in any number of styled enclosures, the only problem being that there must be an area which will permit the pointers to rotate unrestrictedly.

What is claimed is:

A speed indicating device for an automotive vehicle comprising an interiorly hollowed housing, a front cover secured to one end of said housing, said cover having an enlarged glass covered opening having a transparent portion and an opaque portion, a rear cover secured to said housing, a speedometer operating mechanism having a rotating axis secured to the inside of said rear cover, a vertically disposed semi-spherical rear masking plate secured to said speedometer mechanism, a vertically disposed semi-spherical rear dial face member secured to said rear masking plate and in front thereof, said rear masking plate and said rear dial face member being disposed behind the transparent portion of the glass covered opening, said rear dial face member being of a different vertical length than said rear masking plate, a semi-spherical front masking plate and front dial face member of substantially the same vertical heights, said front dial face member being substantially shorter in vertical height than said rear dial face member, means for securing said front dial face member and said front masking plate to said rear dial face member and rear masking plate in a spaced apart vertical relationship and between the enlarged glass covered opening transparent portion and the rear dial face member and rear masking plate, each of said dial face members having a row of speed indicating members arranged in ascending order adjacent to the periphery of said members, the rear dial face member beginning with the number which appears as the last number on the front dial face member, an indicator pointer for each dial face member secured on a common shaft secured to the speedometer mechanism rotating axis, said pointers having their free ends laterally displaced with respect to each other, each of said pointers being of lengths corresponding to the size of its respective dial face member, said pointers being movable as a unit about said axis and in front of its respective dial face member.

References Cited in the file of this patent

UNITED STATES PATENTS

| | | |
|---|---|---|
| 2,108,342 | Le Fevre | Feb. 15, 1938 |
| 2,112,704 | Mackay | Mar. 29, 1938 |
| 2,255,663 | Hanson | Sept. 9, 1941 |
| 2,278,520 | Klein | Apr. 7, 1942 |
| 2,286,737 | Hills | June 16, 1942 |

FOREIGN PATENTS

| | | |
|---|---|---|
| 937,619 | France | Mar. 15, 1948 |